United States Patent
Quint et al.

(10) Patent No.: US 12,165,513 B2
(45) Date of Patent: Dec. 10, 2024

(54) VEHICLE FOOTPRINT BASED PARKING IDENTIFICATION

(71) Applicant: Rivian IP Holdings, LLC, Plymouth, MI (US)

(72) Inventors: Jason Meyer Quint, Ann Arbor, MI (US); Kok Wei Koh, Mountain View, CA (US); Matthew Royce Miller, San Francisco, CA (US); Mary Elizabeth Mossey, Costa Mesa, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 260 days.

(21) Appl. No.: 17/878,775

(22) Filed: Aug. 1, 2022

(65) Prior Publication Data

US 2024/0038072 A1     Feb. 1, 2024

(51) Int. Cl.
*G08G 1/14* (2006.01)
*G01C 21/36* (2006.01)

(52) U.S. Cl.
CPC ......... *G08G 1/143* (2013.01); *G01C 21/3691* (2013.01)

(58) Field of Classification Search
None
See application file for complete search history.

(56) References Cited

U.S. PATENT DOCUMENTS

| | | | | |
|---|---|---|---|---|
| 9,171,469 B2* | 10/2015 | Gupta | ...................... | G08G 1/146 |
| 9,632,673 B1* | 4/2017 | Schneider | ............... | G06Q 10/10 |
| 9,686,646 B1* | 6/2017 | Pecard | ..................... | G01S 19/13 |
| 10,583,828 B1* | 3/2020 | Han | ........................ | G08G 1/168 |
| 10,801,860 B2* | 10/2020 | Dorum | ................. | G09B 29/106 |
| 11,660,998 B1* | 5/2023 | Duany | ....................... | B60P 3/36 |
| | | | | 296/163 |
| 2014/0214249 A1* | 7/2014 | Freeman | .................. | B60L 8/003 |
| | | | | 180/2.2 |
| 2014/0232562 A1* | 8/2014 | Gupta | .................... | G08G 1/149 |
| | | | | 340/932.2 |
| 2014/0267688 A1* | 9/2014 | Aich | ...................... | B60W 30/00 |
| | | | | 348/113 |

(Continued)

FOREIGN PATENT DOCUMENTS

DE     102005017360 A1 * 11/2005     ............. B60Q 9/004

OTHER PUBLICATIONS

"Casting Real-World Shadows", SketchUp, 7 pages, available online at: https://web.archive.org/web/20190114104850/https://help.sketchup.com/en/sketchup/casting-real-world-shadows: last accessed Jun. 11, 2024 (Year: 2019).*

(Continued)

*Primary Examiner* — Daniel L Greene
(74) *Attorney, Agent, or Firm* — Patterson + Sheridan, LLP

(57) ABSTRACT

Various embodiments provide recommendations for a parking area for a vehicle. Information regarding an object within a specified area is detected by a sensor of the vehicle. The specified area is divided into a plurality of tiles. Based on the information regarding the object, one or more of the tiles is classified as unobstructed tiles. Based on the one or more unobstructed tiles and a footprint of the vehicle, a parking area for the vehicle is identified within the specified area. The footprint of the vehicle fits inside the parking area. A visualization associated with the parking area is generated.

19 Claims, 14 Drawing Sheets

(56) References Cited

U.S. PATENT DOCUMENTS

| | | | | |
|---|---|---|---|---|
| 2014/0292542 A1* | 10/2014 | Bruning | .................. | G06G 1/14 |
| | | | | 340/932.2 |
| 2016/0129939 A1* | 5/2016 | Singh | .................. | B62D 15/028 |
| | | | | 701/41 |
| 2016/0371983 A1* | 12/2016 | Ronning | .............. | B62D 15/027 |
| 2017/0324896 A1* | 11/2017 | Gharabegian | .......... | A45B 17/00 |
| 2017/0329341 A1* | 11/2017 | Rakshit | ................. | H04W 4/029 |
| 2020/0003901 A1* | 1/2020 | Shroff | ..................... | G06T 17/20 |
| 2021/0157465 A1* | 5/2021 | Turk | ..................... | G06F 3/0416 |
| 2022/0163335 A1* | 5/2022 | Beaurepaire | ....... | G01C 21/3492 |

OTHER PUBLICATIONS

English Translation of DE_102005017360_A1 (Year: 2005).*

* cited by examiner

VEHICLE FOOTPRINT BASED PARKING IDENTIFICATION

INTRODUCTION

Generally, vehicles have storage compartments (e.g., passenger compartment, trunk, cargo bed, frunk, GEAR TUNNEL) that a user may want to open and access when the vehicle is parked. Additionally, vehicles may have accessories that a user may want to deploy or use when the vehicle is parked. Consequently, a user may want to park in a location that allows for access to, or usage of, the storage compartments or the accessories.

BRIEF SUMMARY

In some embodiments, a control system for a vehicle may identify a parking area (e.g. parking areas at a campsite) within a specified area based on information (e.g., position, dimensions) regarding an object within the specified area and a footprint of the vehicle. Information regarding the object may be detected by a sensor of the vehicle. The specified area may be divided into a plurality of tiles. One or more of the tiles may be classified as unobstructed tiles based on the information regarding the object. For example, one or more tiles may be classified as unobstructed tiles when there is no object within the one or more tiles. In another example, one or more tiles may be classified as unobstructed tiles when the object within the one or more tiles is not an object of interest. An object of interest may be based on a dimension of the object exceeding a dimension threshold. Based on the one or more unobstructed tiles and a footprint of the vehicle, a parking area for the vehicle within the specified area may be identified. The parking area may be based on a footprint of the vehicle fitting inside the parking area. Based on the identified parking area, a visualization associated with the identified parking area may be generated.

In some embodiments, the footprint of the vehicle comprises a configuration of one or more of the tiles. The parking area may be a configuration of a contiguous set of the one or more unobstructed tiles.

In some embodiments, the parking area may be further based on a user preference. The user preference may include usage of an accessory of the vehicle, access to a storage compartment of the vehicle, or maximization of a shaded area. The shaded area may include shade associated with the vehicle or the accessory or shade associated with the environment.

In some embodiments, the footprint of the vehicle may be modified based on the user preference. The footprint of the vehicle may be modified based on the usage of the accessory and a footprint associated with the accessory. The footprint of the vehicle may also be modified based on the access to the storage compartment and a footprint associated with a space for accessing the storage compartment.

In some embodiments, a parking direction may be identified based on the user preference of maximization of the shaded area. The maximization of the shaded area may be based on shade parameters. Shade parameters may include dimensions of the vehicle, dimensions of the accessory, a location associated with the vehicle, an orientation associated with the vehicle, or a position of the sun.

In some embodiments, the control system may predict a position and an area of the shaded area for a specified time interval (e.g., sunrise to sunset on a specified date). A visualization of the shaded area for the specified time interval may be generated based on the position and the area of the shaded area. The visualization of the shaded area may include a visualization of the position and the area of the shaded area. The visualization of the shaded area may also include a timeline of the visualization and a scrubber for navigation of the visualization. For example, a user may scrub through the timeline of the visualization to a selected time, and the visualization may show where the shaded area will be at the selected time.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g., method, can be claimed in another claim category, e.g., system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DETAILED DESCRIPTION

Figure 1:
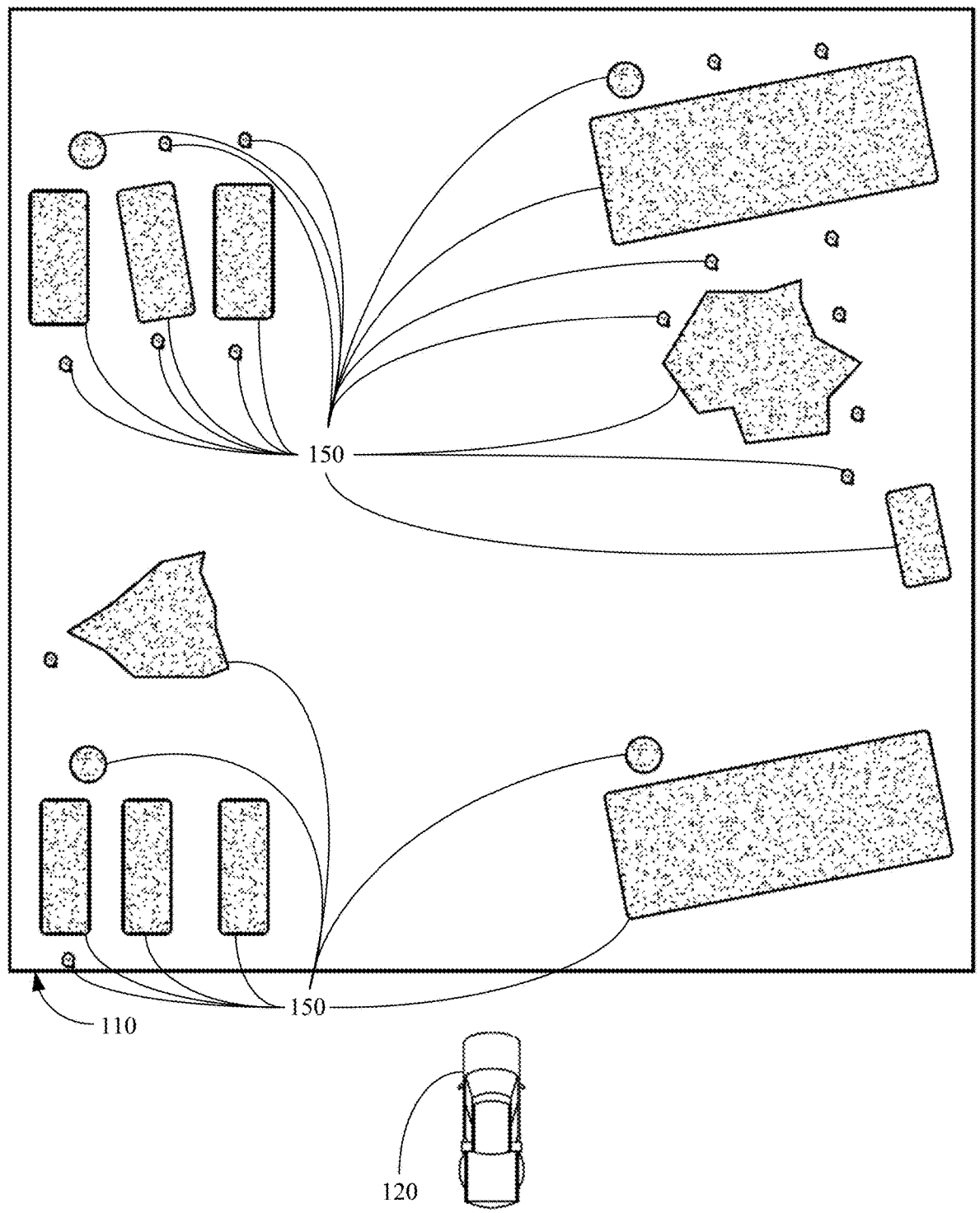
FIG. 1 illustrates an example of a specified area, including a plurality of objects.

In some embodiments, a control system for a vehicle may identify a parking area (e.g. parking areas at a campsite) within a specified area based on information (e.g., position, dimensions) regarding an object within the specified area and a footprint of the vehicle. Information regarding the object may be detected by a sensor of the vehicle. The specified area may be divided into a plurality of tiles. One or more of the tiles may be classified as unobstructed tiles based on the information regarding the object. For example, one or more tiles may be classified as unobstructed tiles when there is no object within the one or more tiles. In another example, one or more tiles may be classified as unobstructed tiles when the object within the one or more tiles is not an object of interest. An object of interest may be based on a dimension of the object exceeding a dimension threshold. Based on the one or more unobstructed tiles and a footprint of the vehicle, a parking area for the vehicle within the specified area may be identified. The parking area may be based on a footprint of the vehicle fitting inside the parking area. Based on the identified parking area, a visualization associated with the identified parking area may be generated.

In some embodiments, the footprint of the vehicle comprises a configuration of one or more of the tiles. The parking area may be a configuration of a contiguous set of the one or more unobstructed tiles.

In some embodiments, the parking area may be further based on a user preference. The user preference may include usage of an accessory of the vehicle, access to a storage compartment of the vehicle, or maximization of a shaded area. The shaded area may include shade associated with the vehicle or the accessory or shade associated with the environment.

In some embodiments, the footprint of the vehicle may be modified based on the user preference. The footprint of the vehicle may be modified based on the usage of the accessory and a footprint associated with the accessory. The footprint of the vehicle may also be modified based on the access to the storage compartment and a footprint associated with a space for accessing the storage compartment.

In some embodiments, a parking direction may be identified based on the user preference of maximization of the shaded area. The maximization of the shaded area may be based on shade parameters. Shade parameters may include dimensions of the vehicle, dimensions of the accessory, a location associated with the vehicle, an orientation associated with the vehicle, or a position of the sun.

In some embodiments, the control system may predict a position and an area of the shaded area for a specified time interval (e.g., sunrise to sunset on a specified date). A visualization of the shaded area for the specified time interval may be generated based on the position and the area of the shaded area. The visualization of the shaded area may include a visualization of the position and the area of the shaded area. The visualization of the shaded area may also include a timeline of the visualization and a scrubber for navigation of the visualization. For example, a user may scrub through the timeline of the visualization to a selected time, and the visualization may show where the shaded area will be at the selected time.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g., method, can be claimed in another claim category, e.g., system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

FIG. 1 illustrates an example of specified area 110. In some embodiments, specified area 110 may include an area specified by the user. Specified area 110 may include an area within which vehicle 120 or a mapper of vehicle 120 can traverse. The mapper of vehicle 120 may include a drone or a remote-controlled vehicle. Within specified area 110 may be a plurality of objects 150. Information regarding objects 150 may be captured by a sensor of the vehicle. The information may include a position, an object height, an object width, an object length, or an object clearance height of objects 150. Within specified area 110 may also be a plurality of ground slope angles. A ground slope angle may be detected by a sensor of the vehicle.

In some embodiments, the information may be detected by a sensor associated with vehicle 120 or a mapper (e.g., a drone or a remote-controlled vehicle). The sensor may include a light sensor, a radio detection and ranging (RADAR) sensor, an ultrasonic sensor, a light detection and ranging (LiDAR) sensor, a proximity sensor, or a distance sensor. The light sensor may include a camera or an infrared sensor.

Figure 2:
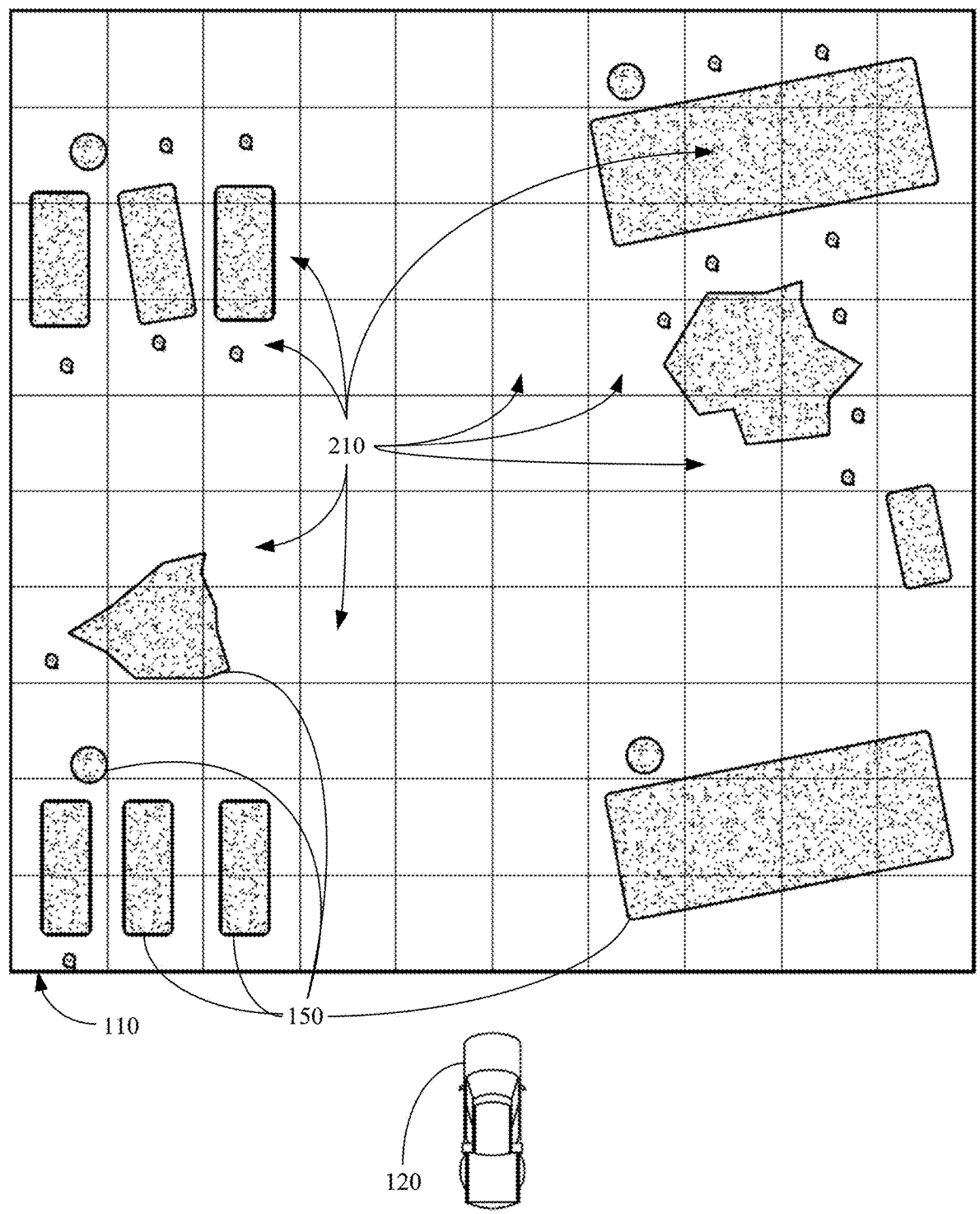
FIG. 2 illustrates an example of the specified area divided into a plurality of tiles.

FIG. 2 illustrates an example of specified area 110 divided into a plurality of tiles 210. In some embodiments, tiles 210 may span specified area 110 and may divide specified area 110 uniformly (i.e., each of tiles 210 may be equal in size). Alternatively, tiles 210 may be a specified size. A smaller specified size of tiles 210 may increase the resolution and may increase the potential of identifying parking areas (i.e., identifying a parking area wherein vehicle 120 barely fits). A larger specified size of tiles 210 may decrease the processing time required to identify the parking areas. Tiles 210 may be overlapping and may increase the potential of identifying parking areas. Tiles 210 may be non-overlapping and may decrease the processing time required to identify parking areas.

In some embodiments, the footprint of vehicle 120 may comprise a configuration of one or more tiles. The configuration of the one or more tiles may be adjacent or contiguous. The configuration of the one or more tiles may be the tiles connected orthogonally (i.e., the tiles may be polyominoes). By way of example and not limitation, the configuration of tiles may be three tiles long, three tiles wide, "L" shaped, or a 2×2 square. The configuration of the one or more tiles may also be disconnected. By way of example and not limitation, the configuration of tiles may be two tiles that are separated by a tile in between. Such a tile configuration may be desirable when accessories of vehicle 120 are positioned away from vehicle 120 (e.g., tents or outhouses).

In some embodiments, the footprint of the vehicle may include information about a vehicle area, a vehicle length, or a vehicle width. The vehicle length may include the vehicle length or the vehicle length and an accessory length. The vehicle width may include the vehicle width or the vehicle width and an accessory width.

In some embodiments, the footprint of vehicle 120 may be modified based on a user preference. The user preference may include usage of an accessory of vehicle 120, access to a storage compartment of vehicle 120, or maximization of a shaded area. The user preference of maximization of shaded area may include shade associated with vehicle 120 or the accessory, or shade associated with an environment. Accessories of vehicle 120 or storage compartments of vehicle 120 may have an associated footprint. The footprint associated with the storage compartments of vehicle 120 may include a space for accessing the storage compartment. Modifying the footprint of vehicle 120 may include adding the footprint associated with the accessories of vehicle 120 or storage compartments of vehicle 120 to the footprint of vehicle 120.

Figure 3:
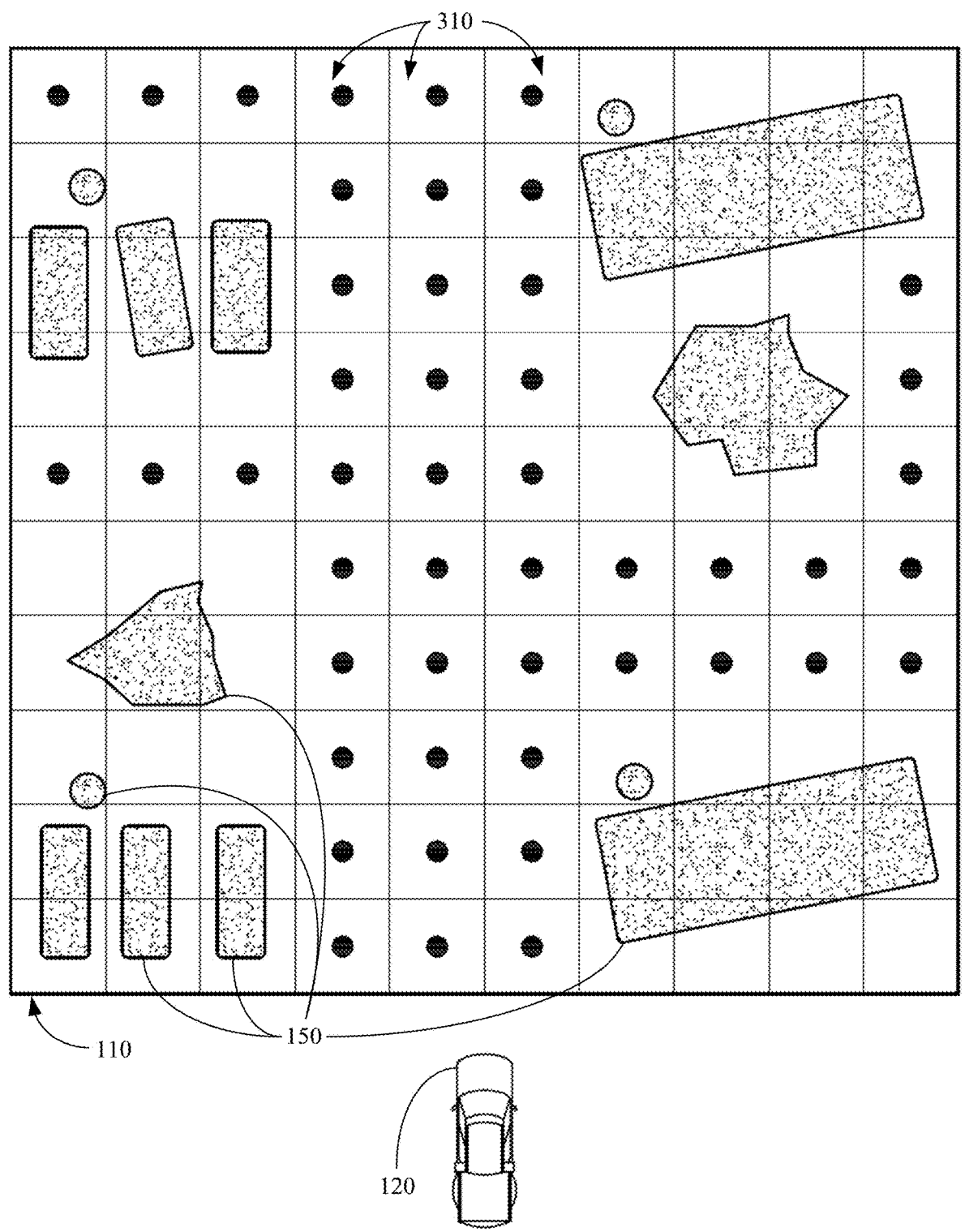
FIG. 3 illustrates an example of parking areas for the vehicle within the specified area.

FIG. 3 illustrates an example of parking areas 310 for vehicle 120. In some embodiments, parking areas 310 for vehicle 120 may be based on information regarding objects 150 and a footprint of vehicle 120. One or more of tiles 210 may be classified as unobstructed tiles based on the information regarding objects 150. A tile of tiles 210 may be classified as an unobstructed tile when there are no objects 150 positioned within the tile. The tile may be classified as an unobstructed tile when there are no objects of interest positioned within the tile. An object of interest may be an object with a dimension being greater than a dimension threshold. The dimension threshold may include an object height threshold, an object width threshold, an object length threshold, or an object clearance height threshold. For example, the object of interest may be identified based on the object height being greater than the object height threshold, the object width being greater than the object width threshold, the object length being greater than the object length threshold, or the object clearance height being greater than the object vertical clearance threshold.

In particular embodiments, one or more of tiles 210 may be classified as unobstructed tiles based on the information regarding a ground slope being less than a slope threshold. The slope threshold may be specified by the user. The slope threshold may be specified to allow usage of the accessory or to allow access to the storage compartment. The slope threshold may be received by vehicle 120 from the accessory of the vehicle 120. For example, a camp kitchen accessory may provide a specified slope threshold, wherein the specified slope threshold allows for the use of the camp kitchen accessory.

In some embodiments, parking area 310 for the vehicle may be a configuration of one or more contiguous unobstructed tiles. Parking area 310 may include an area where the footprint of the vehicle fits inside.

Figure 4:
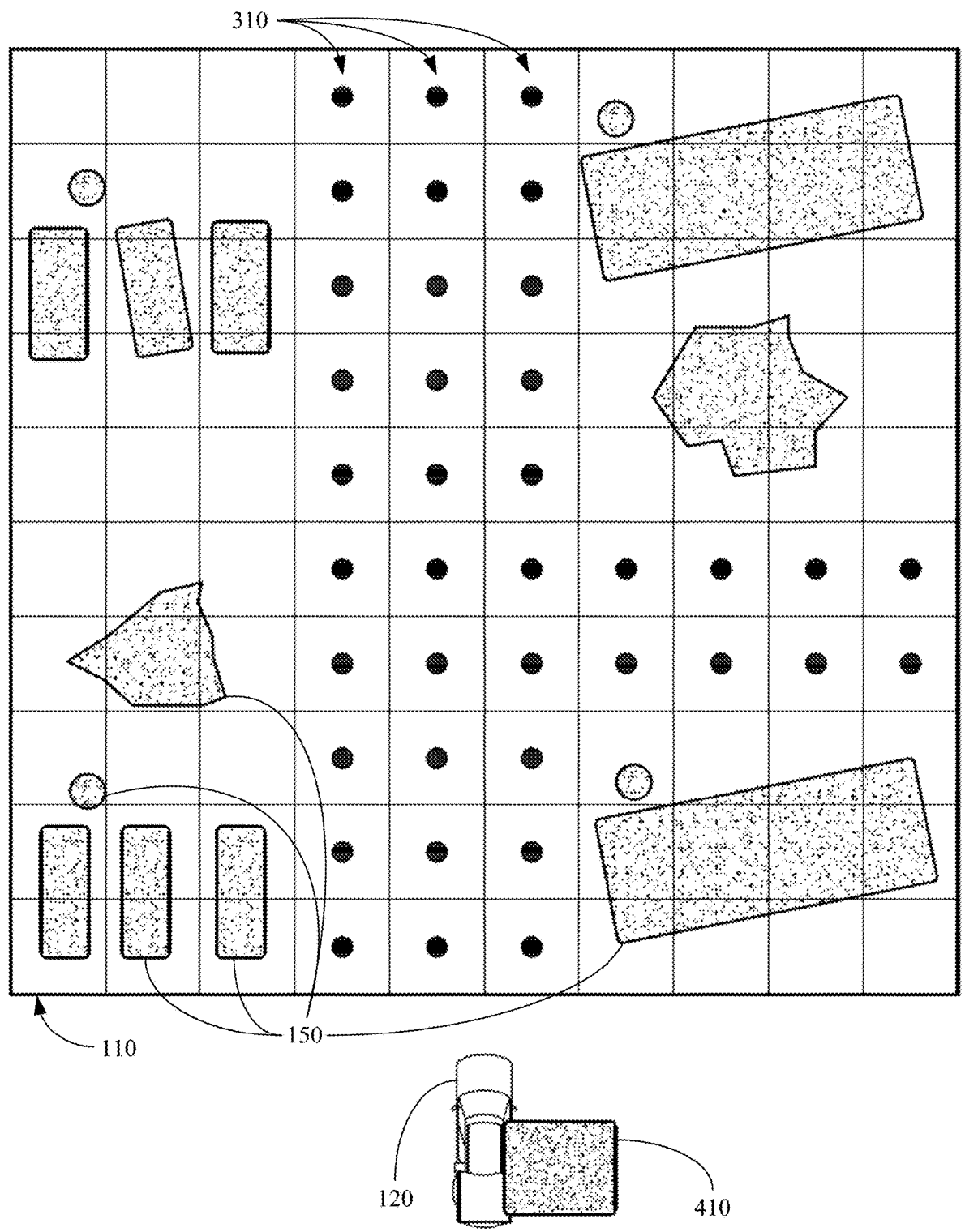
FIG. 4 illustrates an example of parking areas for the vehicle within the specified area that can accommodate an accessory of the vehicle.

FIG. 4 illustrates an example of parking areas 310 for vehicle 120. In some embodiments, parking areas 310 may be identified for vehicle 120 when the user preference for the usage of accessory 410 of vehicle 120 is accessory 410 may be used. Accessory 410 may also be detected by wireless communication between accessory 410 and vehicle 120. Detection of accessory 410 may generate a prompt to the user regarding whether accessory 410 may be used. The wireless communication between accessory 410 and vehicle 120 may be using near-field communication (NFC), BLUETOOTH, ultra-wideband (UWB), or Wi-Fi. Parking areas 310 may also be identified for vehicle 120 when the user preference for access to the storage compartment is the storage compartment may be accessed.

Parking areas 310 may be based on a modified footprint of vehicle 120. The modification may be based on the footprint associated with accessory 410 or the space for accessing the storage compartment.

Figure 5:
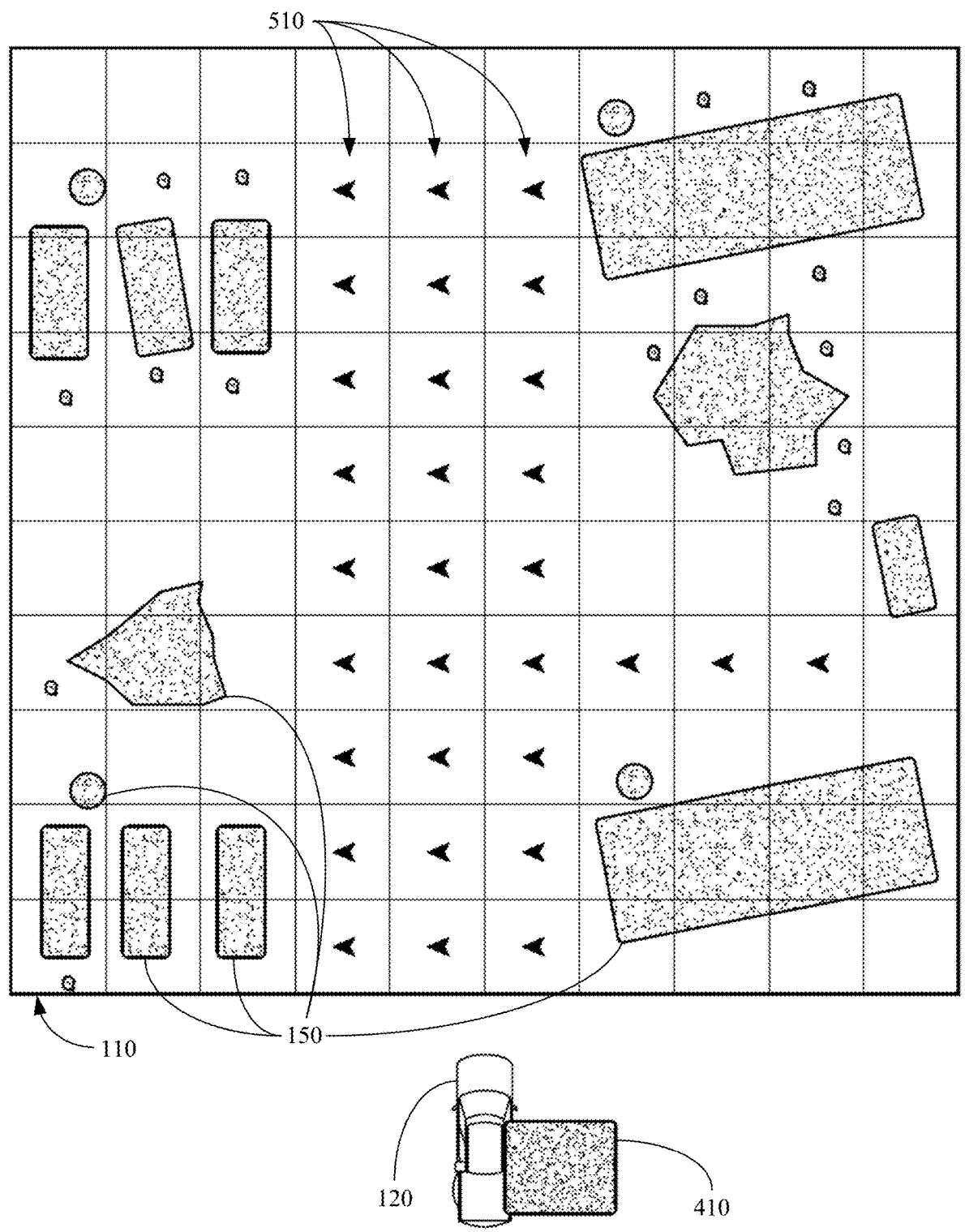
FIG. 5 illustrates an example of directional parking areas for the vehicle.

FIG. 5 illustrates an example of directional parking areas 510 for vehicle 120. In some embodiments, directional parking areas 510 may be identified based on a user preference. The user preference may be the maximization of a shaded area. The shaded area may include shade associated with vehicle 120 or accessory 410, or shade associated with the environment.

The maximization of the shaded area may be based on shade parameters. The shade parameters may include dimensions of vehicle 120, dimensions of accessory 410, a location associated with vehicle 120, an orientation associated with vehicle 120, or a position of a sun. The dimensions of vehicle 120 may include a vehicle height, a vehicle width, or a vehicle length. The dimensions of accessory 410 may include an accessory height, an accessory width, or an accessory length. The location associated with vehicle 120 may include a vehicle direction, a vehicle pitch, or a vehicle roll. The position of the sun may include an azimuth angle of the sun or an elevation of the sun. The shade parameters may also include an ambient light reading, weather information associated with the location associated with vehicle 120, or dimensions of object 150. The ambient light reading may be captured by a sensor associated with vehicle 120, a sensor associated with accessory 410, or a sensor associated with the mapper of vehicle 120. Dimensions of object 150 include an object height, an object width, an object length, or an object clearance height.

The directional indicators may indicate the direction vehicle 120 may park to maximize the shaded area. For example, an awning may be deployable in any direction the vehicle is parked within parking area 310 or directional parking area 510, but the maximization of shade from the awning may only be when the vehicle is parked in the direction of the directional indicators.

Figure 6:
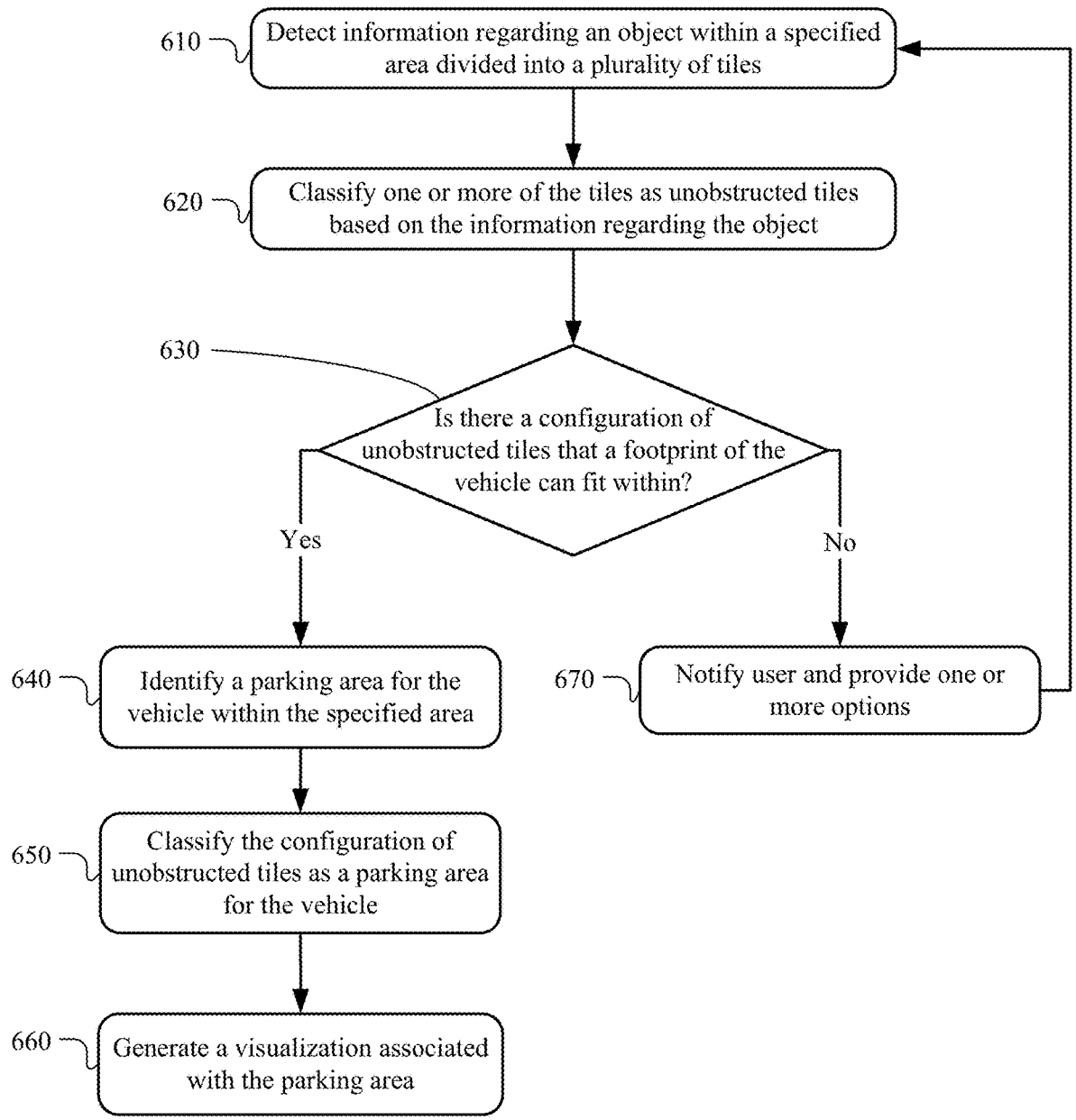
FIG. 6 is a flowchart illustrating steps of a method for identifying one or more parking areas.

FIG. 6 is a flowchart illustrating steps of a method 600 for identifying one or more parking areas 310. Method 600 may begin at step 610 with a sensor of the vehicle detecting information regarding object 150 within specified area 110. Specified area 110 may be divided into a plurality of tiles 210. Method 600 may continue at step 620 with a control module classifying one or more of tiles 210 as one or more unobstructed tiles based on the information regarding object 150. At decision point 630, the control module may determine whether there is a configuration of unobstructed tiles that a footprint of vehicle 120 can fit within. If yes, method 600 may continue at step 640 with the control module identifying parking area 310 for vehicle 120 within specified area 110. Method 600 may then continue at step 650 with the control module classifying the configuration of unobstructed tiles as parking area 310 for vehicle 120. Method 600 may then continue at step 660 with the control module generating a visualization associated with parking area 310. Otherwise, if not, then at step 670, the control module may notify the user and present one or more options (e.g., locating another campsite or increasing the size of the specified area to assess and returning to step 610 of method 600 to assess the enlarged specified area).

Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for identifying one or more parking areas including the particular steps of the method of FIG. 6, this disclosure contemplates any suitable method for identifying one or more parking areas including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Figure 7:
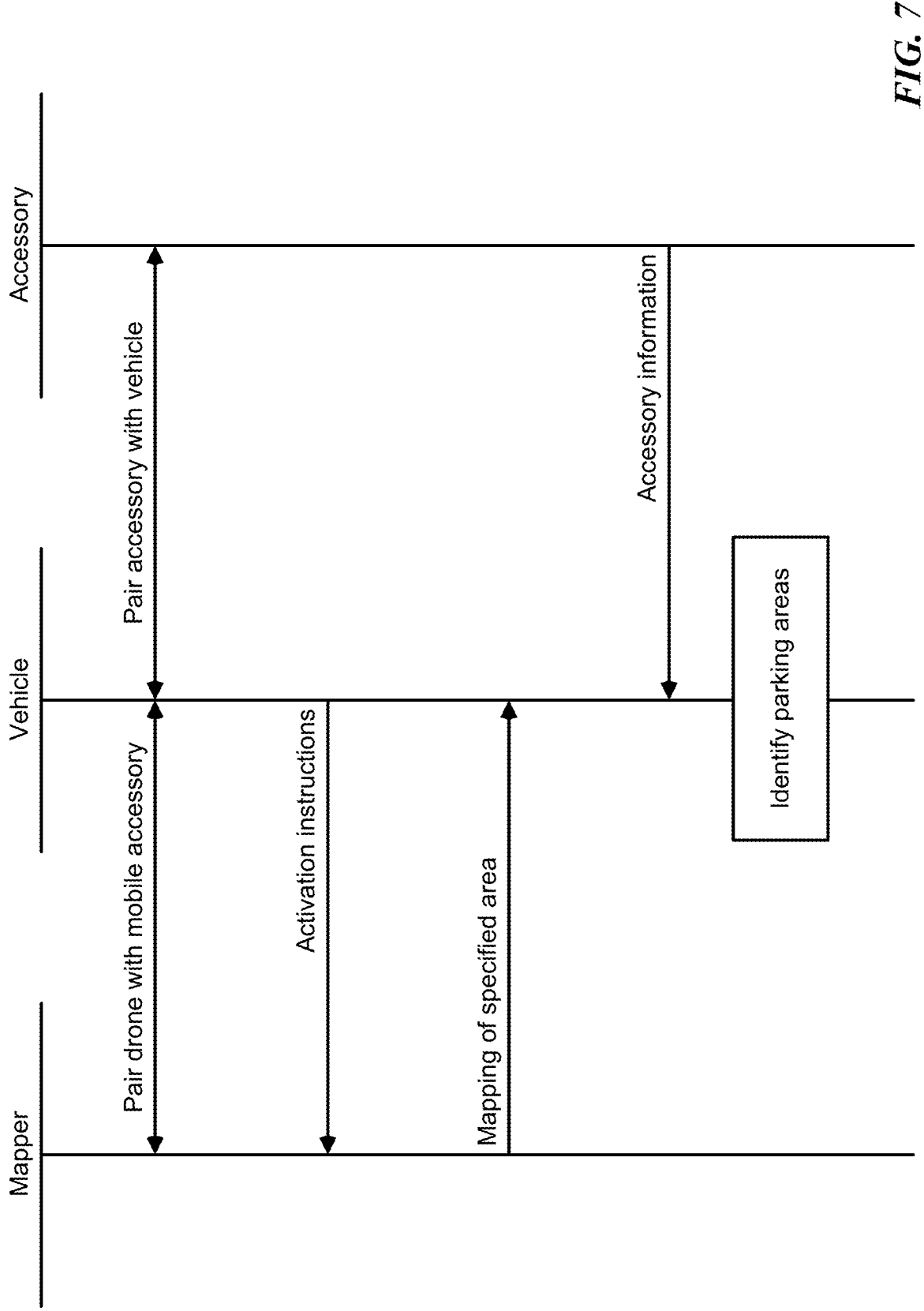
FIG. 7 is a diagram illustrating exchanges between a vehicle and an accessory of the vehicle.

FIG. 7 is a diagram illustrating exchanges between vehicle 120, a mapper, and accessory 410. The mapper may include a drone or a remote-controlled vehicle. In some embodiments, vehicle 120 may pair with the mapper or accessory 410. Upon pairing with the mapper, vehicle 120 may send activation instructions to the mapper. The activation instructions may include instructions to map specified area 110. The activation instructions may also include instructions on a specified path to map specified area 110. The specified path may include a flight path or a ground path. The flight path and may include height, direction (e.g., heading), distance or time. The ground path may include direction (e.g., heading), distance, or time. The mapper may send a mapping of specified area 110 to vehicle 120. The mapper may continuously send the mapping, batch the mapping, or send the complete mapping upon complete to vehicle 120. The batching of the mapping may be based on the amount of data collected by the mapper, coverage of a certain area of specified area 110, or may be based on an amount of time elapsed. Upon pairing with accessory 410, accessory 410 may send information regarding the size and position relative to vehicle 120 (e.g., where the accessory is mounted or positioned inside or outside the vehicle). For example, an awning accessory may send information regarding the awning accessory being mounted to the passenger side of the vehicle. The position information may be used by the vehicle when identifying parking areas. Accessory 410 may also send information regarding the maximum ground slope angle associated with accessory 410.

Figure 8:
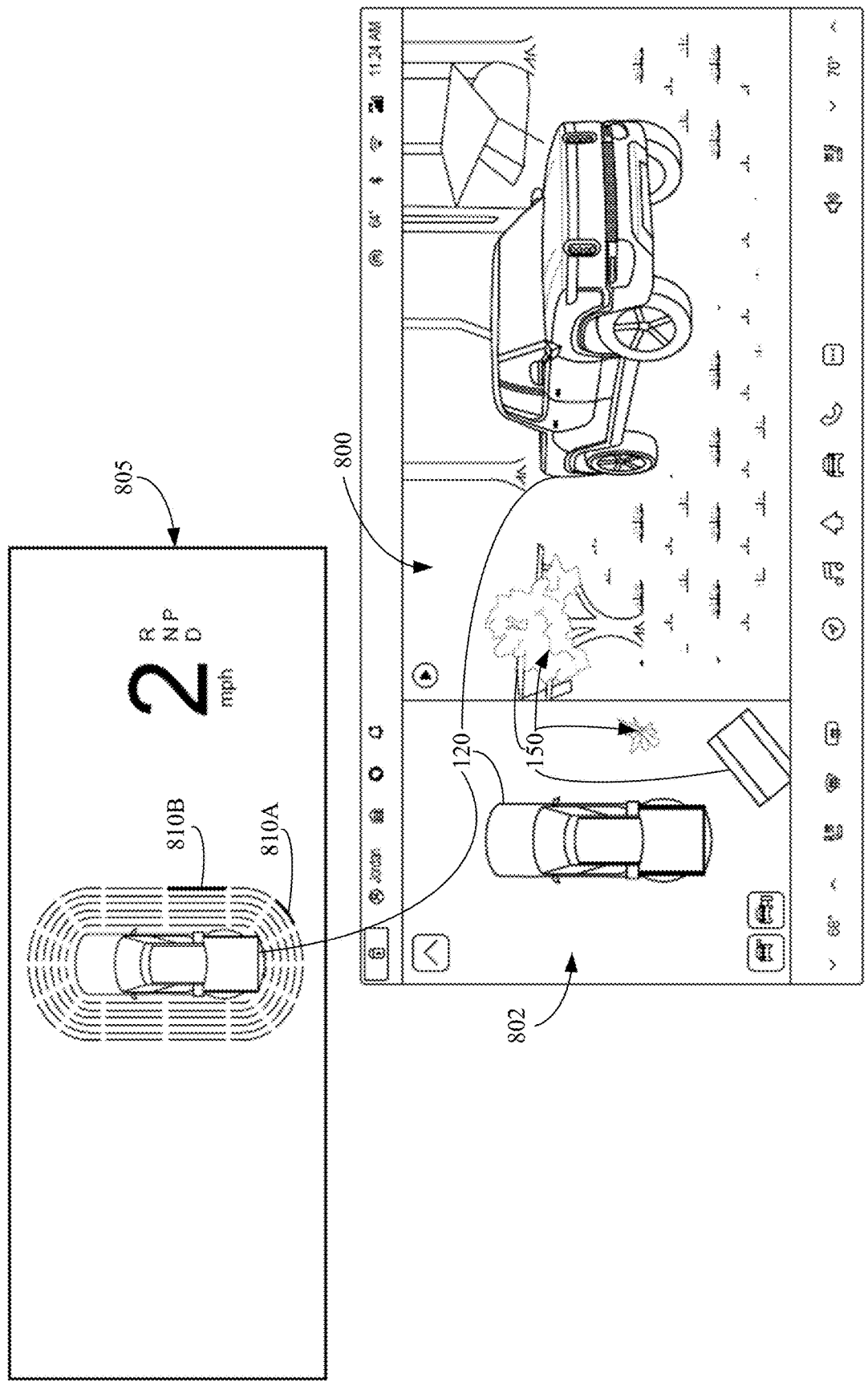
FIG. 8 illustrates an example user interface of a visualization comprising multiple views of the vehicle.

FIG. 8 illustrates an example user interface of a visualization comprising multiple views of vehicle 120. In some embodiments, the user interface may display a visualization associated with parking area 310 or directional parking area 510. The visualization may be surround view 800, top-down view 802, or proximity view 805 of vehicle 120.

The visualization may be camera-based. For example, the visualization may be generated by stitching together images from a camera of vehicle 120. The visualization may also be RADAR, infrared, or LiDAR based.

In surround view 800 or top-down view 802, object 150 or vehicle 120 may be displayed. In proximity view 805, vehicle 120 may be displayed and a proximity of object 150 may be represented as proximity indicators 810A-B. Proximity indicators 810A-B may be a representation of the distance from vehicle 120 to object 150. For example, proximity indicators 810A-B may be yellow when object 150 is within a specified distance, and proximity indicators 810A-B may be red when object 150 is within a closer specified distance.

In some embodiments, the visualizations may include a list view. The list view may include a list of parking area options. Each option in the list of parking area options may be selectable. Each parking area option in the list may include one or more additional icons or other notations describing features of the parking area (e.g., shade, objects). The visualization may also include a navigation view. The navigation view may include driving instructions to parking area 310. The visualization may also include driving instructions to parking area 310, where the parking instructions are configured such that vehicle 120 is facing in the direction required upon arrival. The visualization may also include a map view of all available parking options. The map view may include information detected by a sensor of vehicle 120, including object 150 and an object of interest within specified area 110. The map view may also include tiles 210, parking area 310, and directional parking area 510. Directional parking area 510 may include directional indicators to show a parking direction.

Figure 9:
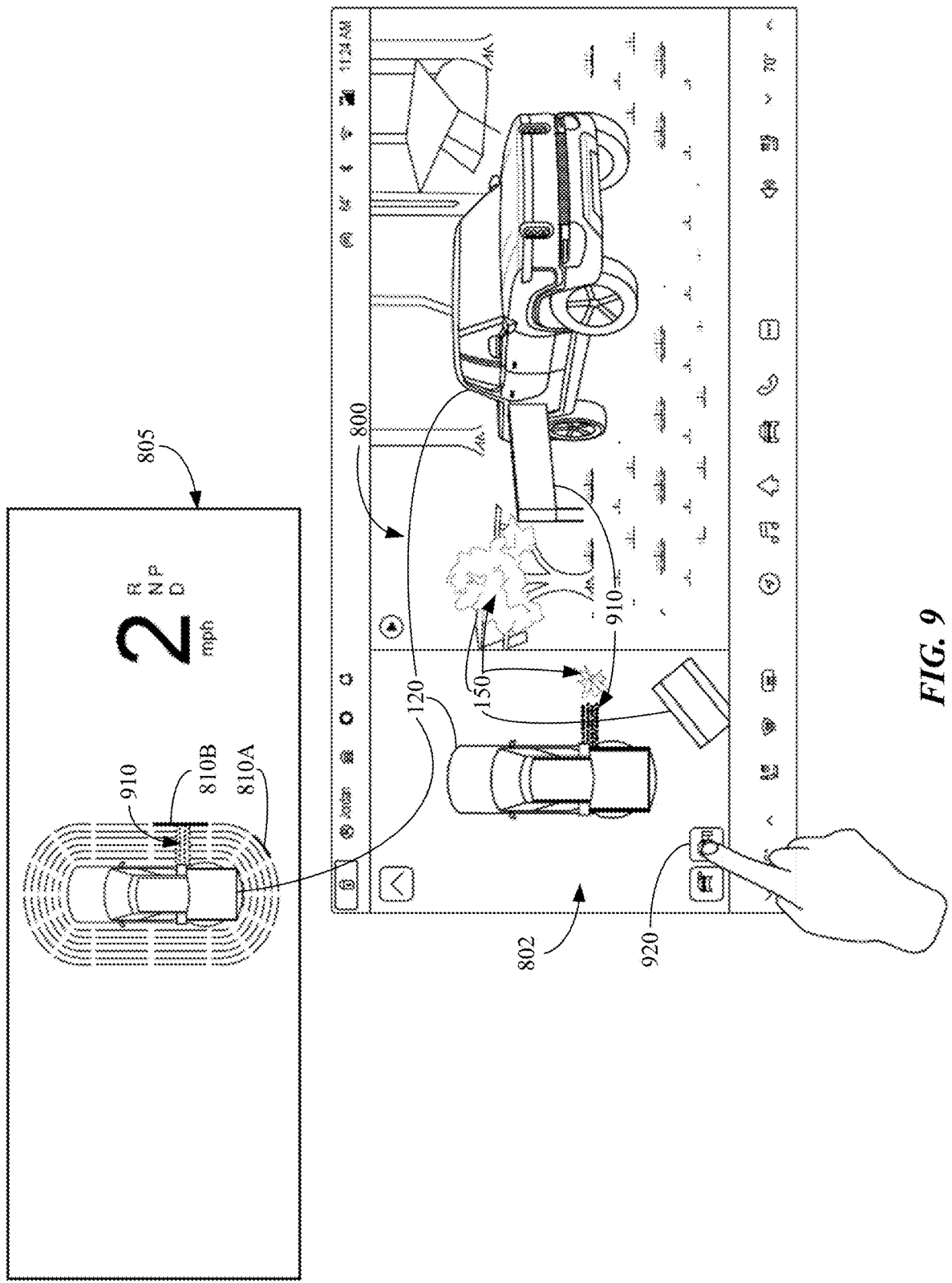
FIG. 9 illustrates an example user interface of a visualization comprising multiple views of the vehicle with an accessory of the vehicle, a camp kitchen.

FIG. 9 illustrates an example user interface of a visualization comprising multiple views of the vehicle with an accessory of the vehicle, a camp kitchen. In some embodiments, a representation of camp kitchen 910 may be enabled by pressing camp kitchen button 920. The representation of camp kitchen 910 may be displayed in surround view 800, top-down view 802, or proximity view 805. The display of the representation of camp kitchen 910 may assist the user in parking by visualizing the distance between the vehicle with camp kitchen 910 and object 150. For example, proximity indicator 810B may change colors from yellow to red when camp kitchen button 920 is pressed because the proximity between camp kitchen 910 is closer (e.g., the distance between the camp kitchen and the object is less than the distance between the vehicle and object 150).

Figure 10:
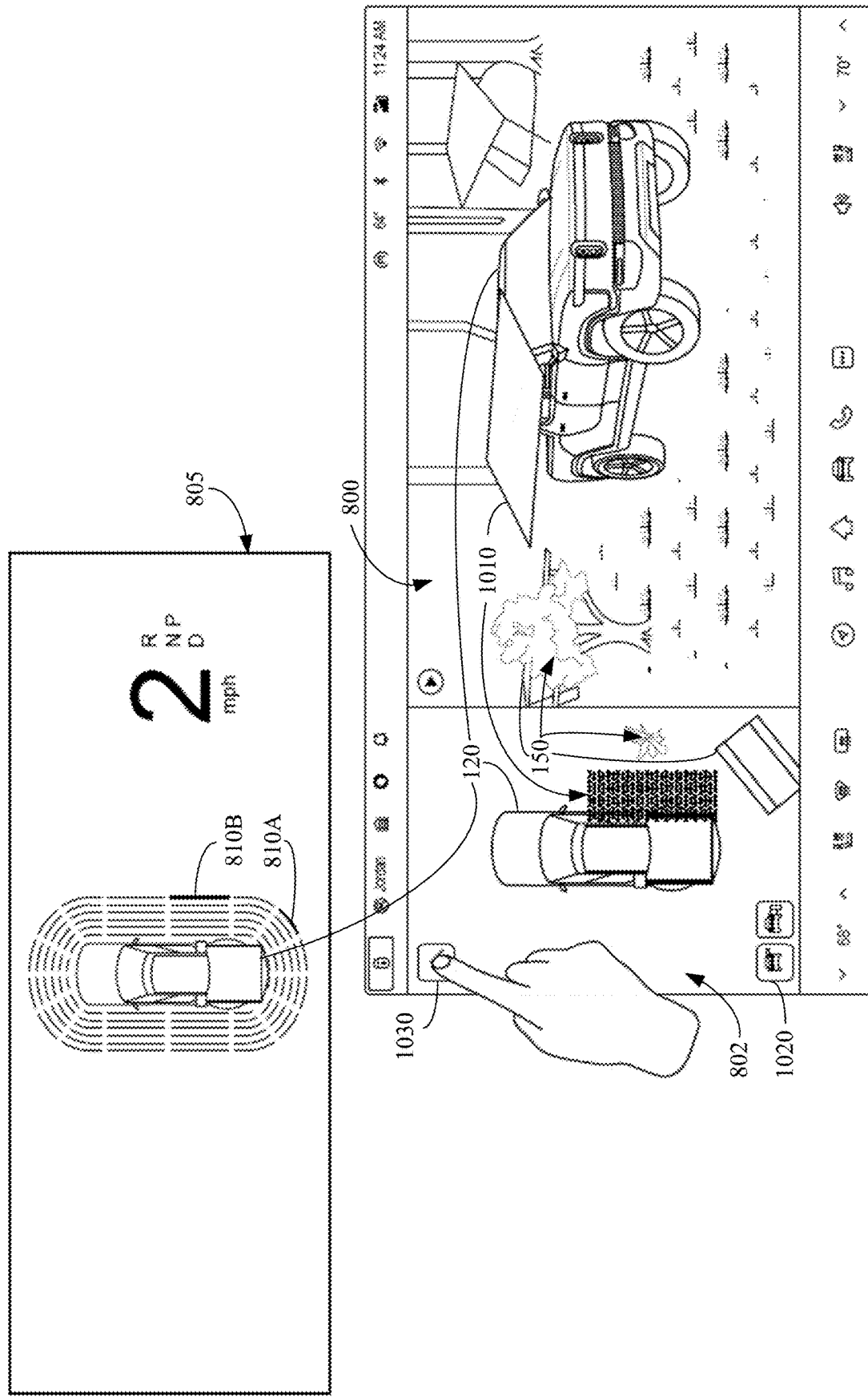
FIG. 10 illustrates an example user interface of a visualization comprising multiple views of the vehicle with an accessory of the vehicle, an awning.

FIG. 10 illustrates an example user interface of a visualization comprising multiple views of vehicle 120 with an accessory 410 of vehicle 120, awning 1010. In some embodiments, a representation of awning 1010 may be enabled by pressing awning button 1020. The representation of awning 1010 may be displayed in surround view 800, top-down view 802, or proximity view 805. The display of the representation of awning 1010 may assist the user in parking by visualizing the distance between the vehicle with awning 1010 and object 150.

In some embodiments, a shade visualization may be enabled by pressing shade predictor button 1030. Upon pressing shade predictor button 1030, a user interface including the shade visualization may be displayed as shown in FIG. 11A.

Figure 11A:
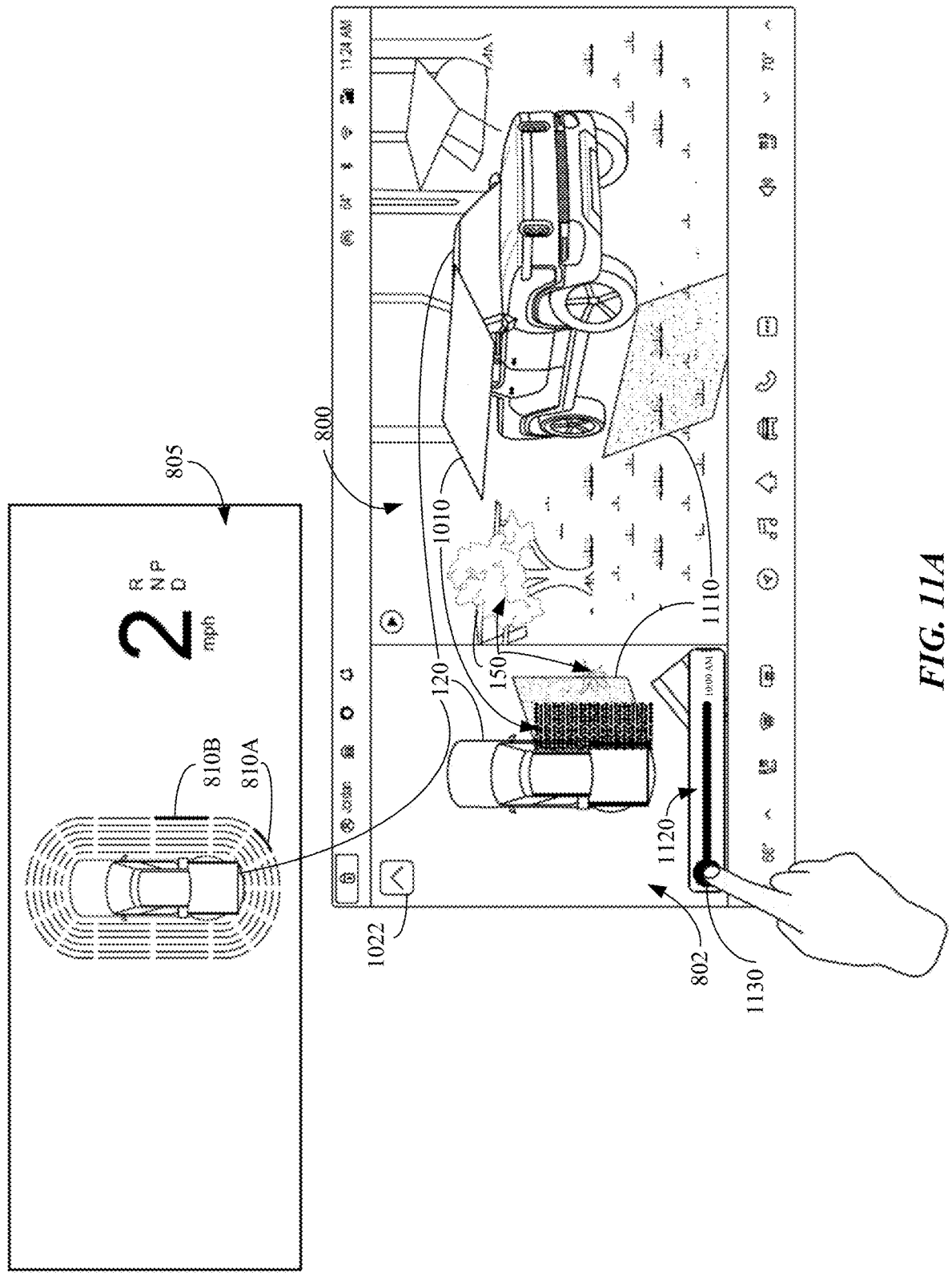
FIG. 11A illustrates an example user interface of a visualization comprising multiple views of the vehicle with an awning and a shaded area of the awning at a specified time.

FIG. 11A illustrates an example user interface of a visualization comprising multiple views of vehicle 120 with an awning and a shaded area of the awning at a specified time. The visualization may include a shade visualization. The shade visualization may include a visualization of a position and an area of shaded area 1110, timeline 1120 of the visualization of shaded area 1110, and a scrubber 1130 for navigation of the visualization of shaded area 1110. The position and the area for shaded area 1110 may be predicted for a specified time or time interval. The representation of shaded area 1110 may be displayed in surround view 800, top-down view 802, or proximity view 805. Timeline 1120 and scrubber 1130 may be used to visualize the shaded area at different times of day.

Shaded areas may also include shade from the environment (e.g., shade from a tree or building). The shade visualization may include the shaded area from the environment. Timeline 1120 and scrubber 1130 may be used to visualize the shaded area from the environment at different times of day.

Figure 11B:
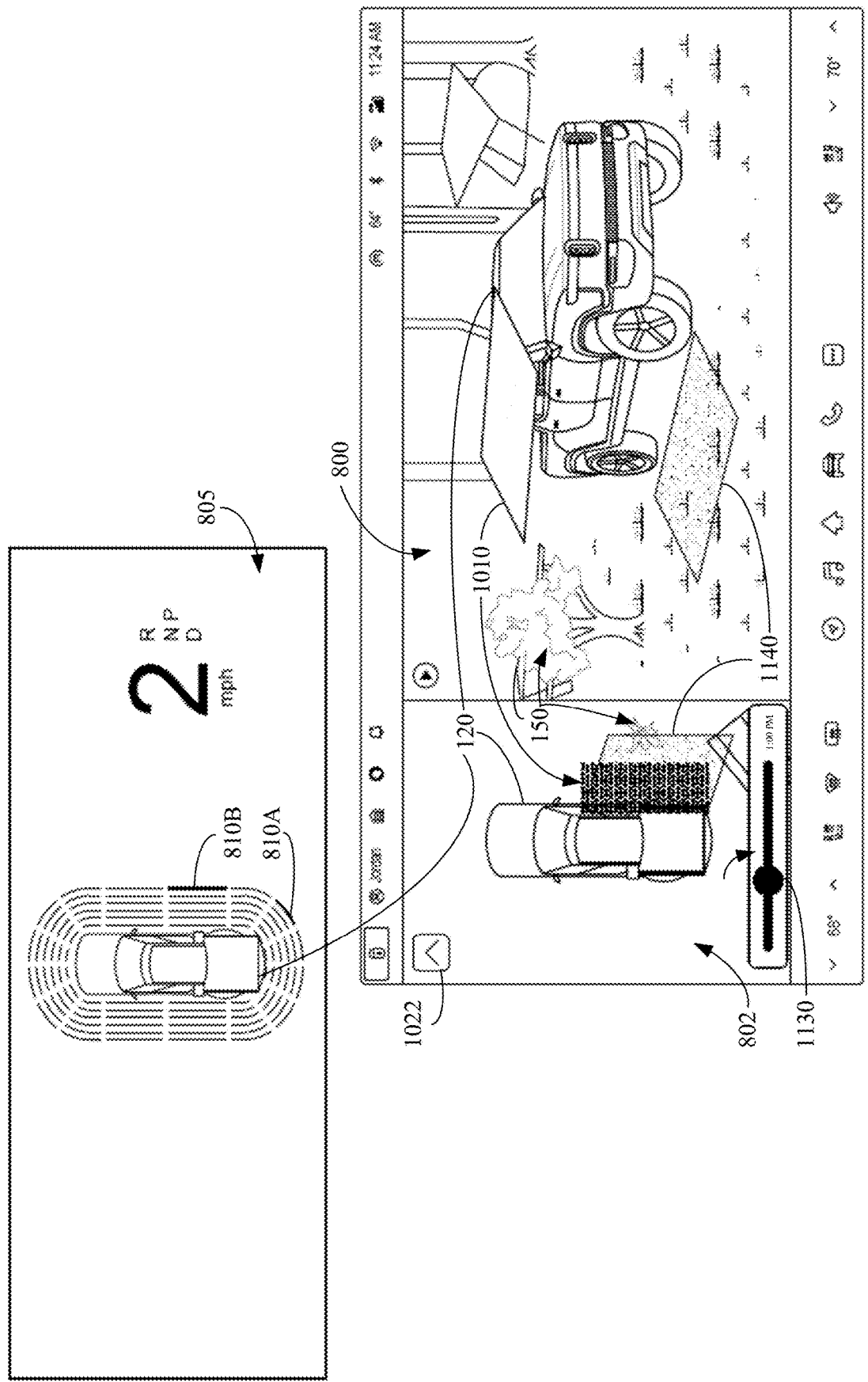
FIG. 11B illustrates an example user interface of a visualization comprising multiple views of the vehicle with an awning and a shaded area of the awning at another specified time.

FIG. 11B illustrates an example user interface of a visualization comprising multiple views of the vehicle with an awning and a shaded area of the awning at another specified time. In some embodiments, timeline 1120 and scrubber 1130 may be used to visualize the shaded area at different times of day. For example, the scrubber may be set to a time in the future and future shaded area 1140 may be a prediction of the shaded area at that time.

Figure 12:
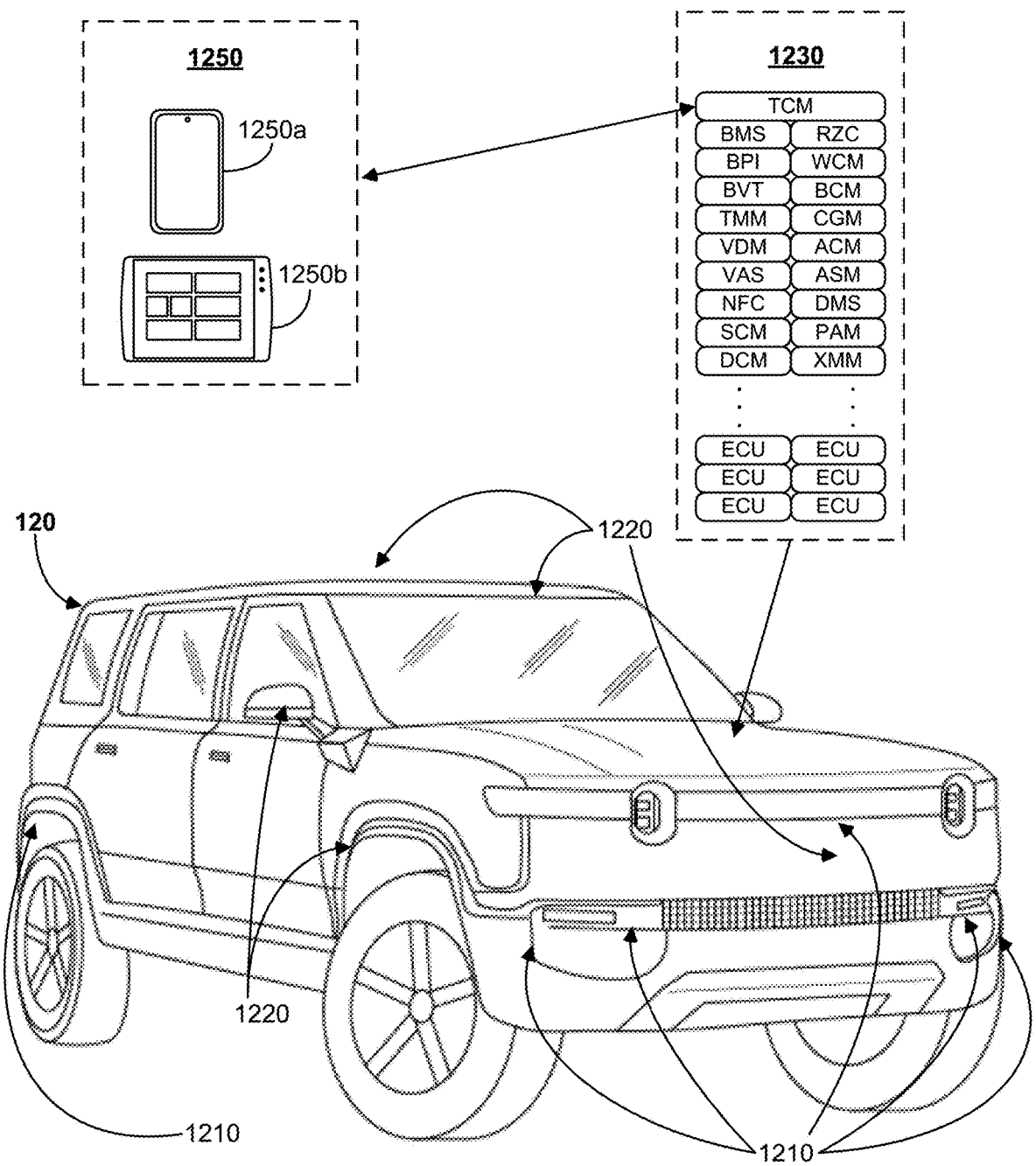
FIG. 12 illustrates an example vehicle.

FIG. 12 illustrates an example vehicle 120. Vehicle 120 may include multiple sensors 1210, multiple cameras 1220, and a control system 1230. In some embodiments, vehicle 120 may be able to pair with a computing device 1250 (e.g., smartphone 1250a, tablet computing device 1250b, or a smart vehicle accessory). As an example and not by way of limitation, a sensor 1210 may be an accelerometer, a gyroscope, a magnometer, a global positioning satellite (GPS) signal sensor, a vibration sensor (e.g., piezoelectric accelerometer), a LiDAR sensor, a RADAR sensor, an ultrasonic sensor, a temperature sensor, a pressure sensor, a humidity sensor, a chemical sensor, an electromagnetic proximity sensor, an electric current sensor, another suitable sensor, or a combination thereof. As an example and not by way of limitation, a camera 1220 may be a still image camera, a video camera, a 3D scanning system (e.g., based on modulated light, laser triangulation, laser pulse, structured light, LiDAR), an infrared camera, another suitable camera, or a combination thereof. Vehicle 120 may include various controllable components (e.g., doors, seats, windows, lights, HVAC, entertainment system, security system), instrument and information displays and/or interactive interfaces, functionality to pair a computing device 1250 with the vehicle (which may enable control of certain vehicle functions using the computing device 1250), and functionality to pair accessories with the vehicle, which may then be controllable through an interactive interface in the vehicle or through a paired computing device 1250.

Control system 1230 may enable control of various systems on-board the vehicle. As shown in FIG. 12, control system 1230 may comprise one or more electronic control units (ECUs), each of which are dedicated to a specific set of functions. Each ECU may be a computer system (as described further in FIG. 13), and each ECU may include functionality provide by one or more of the example ECUs described below.

Features of embodiments as described herein may be controlled by a Vehicle Dynamics Module (VDM) ECU. The VDM ECU may control a number of different functions related to aspects of the vehicle's drivetrain, regenerative braking, suspension, steering, traction control, distribution of mass, aerodynamics, and driving modes. In some embodiments, the VDM ECU may, by way of example and not limitation, control vehicle acceleration, control vehicle energy regeneration, calculate torque distribution, provide traction control, control drive modes, provide odometer functions, control driveline disconnects, adjust damping, adjust roll stiffness, adjust ride height, automatically level a vehicle when on a slope, and control the emergency parking brake driver.

Features of embodiments as described herein may be controlled by a Telematics Control Module (TCM) ECU. The TCM ECU may provide a wireless vehicle communication gateway to support functionality such as, by way of example and not limitation, over-the-air (OTA) software updates, communication between the vehicle and the internet, communication between the vehicle and a computing device 1250, in-vehicle navigation, vehicle-to-vehicle communication, communication between the vehicle and landscape features (e.g., automated toll road sensors, automated toll gates, power dispensers at charging stations), or automated calling functionality.

Features of embodiments as described herein may be controlled by one or more ECUs that may provide functions of an automated driving system (ADS) and/or an advanced driver assistance system (ADAS), and may be enabled by a driver of the vehicle to provide one or more functions to support driving assistance and/or automation. An Autonomy Control Module (ACM) ECU may process data captured by cameras 1220 and/or sensors 1210. In some embodiments, the ACM ECU may provide artificial intelligence functionality to provide and/or refine functions to support driving assistance and/or automation. An Autonomous Safety Module (ASM) ECU may provide functions to support driving safety by monitoring sensors that support self-driving functions. A Park Assist Module (PAM) ECU may provide functions to assist a driver during manual and/or automated parking operations. The PAM ECU may process data captured by cameras 1220 and/or sensors 1210 in order to determine appropriate control commands.

Features of embodiments as described herein may be controlled by an Experience Management Module (XMM) ECU that may generate a user interface displayed on a dashboard of the vehicle. The user interface may display information and provide audio output for an infotainment system, including various views around and inside the vehicle. XMM may provide interactive controls for a number of different vehicle functions that may be controlled in conjunction with enabling the designated mode, such as, by way of example and not limitation: controlling interior and exterior lighting, vehicle displays (e.g., instrument cluster, center information display, and rear console display), audio output (e.g., audio processing, echo cancellation, beam focusing), music playback, heating, ventilation, and air conditioning (HVAC) controls, power settings, Wi-Fi connectivity, Bluetooth device connectivity, and vehicle leveling, as well as displaying information in the user interface (e.g., surround view camera feed, distance to nearest charger, and minimum range). In some embodiments, interactive controls provided by XMM may enable interaction with other modules of control system 1230. In some embodiments, functions of the ACM and the XMM may be combined together into an Autonomous eXperience Module (AXM) ECU.

Vehicle 120 may include one or more additional ECUs, such as, by way of example and not limitation: a Central Gateway Module (CGM) ECU, an Experience Management Module (WM) ECU, a Vehicle Access System (VAS) ECU, a Near-Field Communication (NFC) ECU, a Body Control Module (BCM) ECU, a Seat Control Module (SCM) ECU, a Door Control Module (DCM) ECU, a Rear Zone Control (RZC) ECU, a Driver Monitoring System (DMS) ECU, and/or a Winch Control Module (WCM) ECU. If vehicle 120 is an electric vehicle, one or more ECUs may provide functionality related to the battery pack of the vehicle, such as a Battery Management System (BMS) ECU, a Battery Power Isolation (BPI) ECU, a Balancing Voltage Temperature (BVT) ECU, and/or a Thermal Management Module (TMM) ECU.

Figures 13A, 13B:
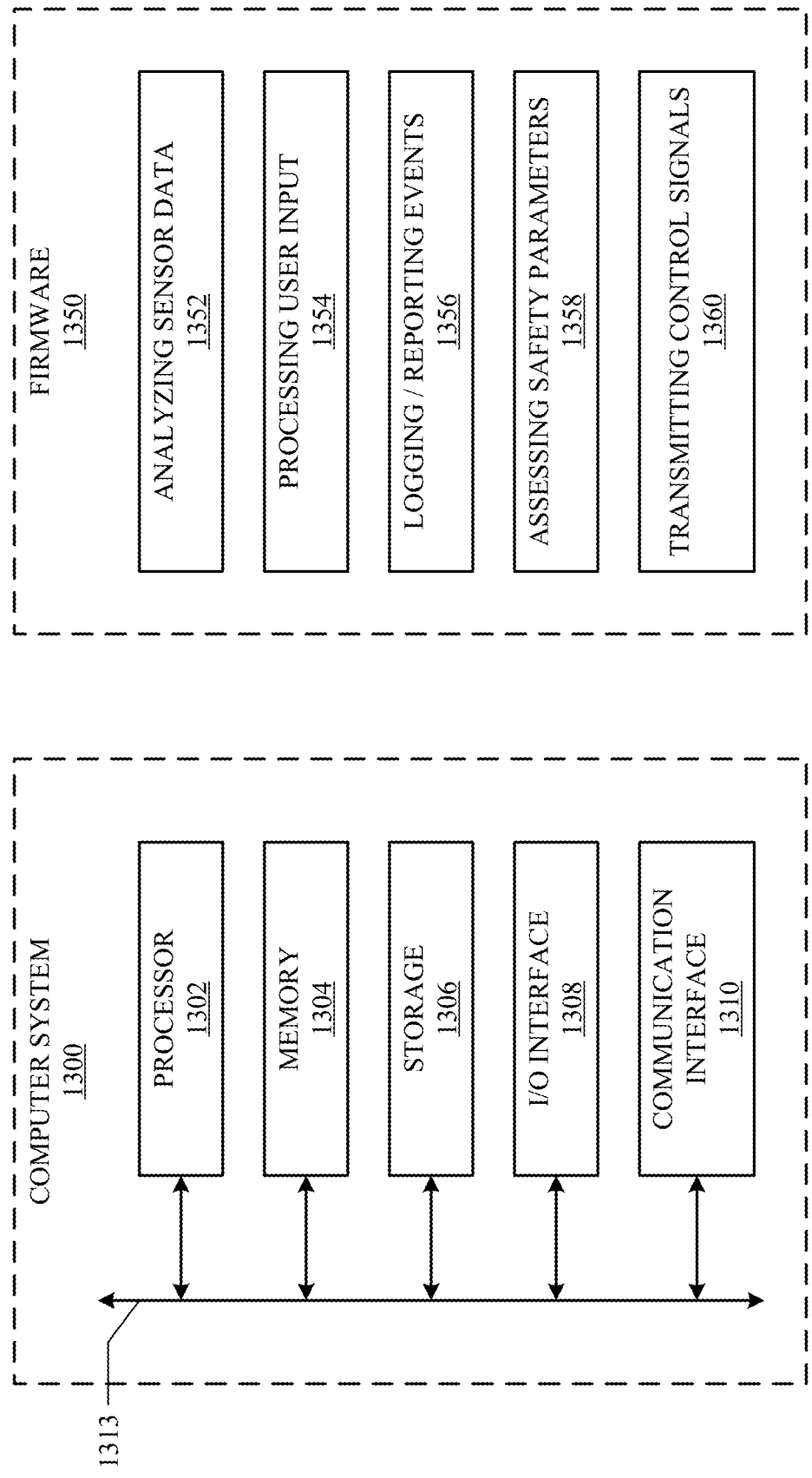
FIG. 13A is a schematic of an example computer system.
FIG. 13B illustrates example firmware for a vehicle ECU.

FIG. 13A illustrates an example computer system 1300. Computer system 1300 may include a processor 1302, memory 1304, storage 1306, an input/output (I/O) interface 1308, a communication interface 1310, and a bus 1312. Although this disclosure describes one example computer system including specified components in a particular arrangement, this disclosure contemplates any suitable computer system with any suitable number of any suitable components in any suitable arrangement. As an example and not by way of limitation, computer system 1300 may be an electronic control unit (ECU), an embedded computer system, a system-on-chip, a single-board computer system, a desktop computer system, a laptop or notebook computer system, a mainframe, a mesh of computer systems, a mobile telephone, a personal digital assistant, a server computing system, a tablet computer system, or a combination of two or more of these. Where appropriate, computer system 1300 may include one or more computer systems 1300; be unitary or distributed; span multiple locations, machines, or data centers; or reside in a cloud, which may include one or more cloud components in one or more networks. Where appropriate, computer system(s) 1300 may perform, at different times or at different locations, in real time or in batch mode, one or more steps of one or more methods described or illustrated herein.

Processor 1302 (e.g., compute units) may include hardware for executing instructions, such as those making up a computer program. As an example and not by way of limitation, to execute instructions, processor 1302 may retrieve (or fetch) the instructions from an internal register, an internal cache, memory 1304, or storage 1306; decode and execute them; and then write one or more results to an internal register, an internal cache, memory 1304, or storage 1306 (e.g., storage units). Processor 1302 may include one or more internal caches for data, instructions, or addresses.

In particular embodiments, memory 1304 includes main memory for storing instructions for processor 1302 to execute or data for processor 1302 to operate on. In particular embodiments, one or more memory management units (MMUs) reside between processor 1302 and memory 1304 and facilitate accesses to memory 1304 requested by processor 1302. In particular embodiments, memory 1304 includes random access memory (RAM). This disclosure contemplates any suitable RAM.

In particular embodiments, storage 1306 includes mass storage for data or instructions. As an example and not by way of limitation, storage 1306 may include a removable disk drive, flash memory, an optical disc, a magneto-optical disc, magnetic tape, or a Universal Serial Bus (USB) drive or two or more of these. Storage 1306 may include removable or fixed media and may be internal or external to computer system 1300. Storage 1306 may include any suitable form of non-volatile, solid-state memory or read-only memory (ROM).

In particular embodiments, I/O interface 1308 includes hardware, software, or both, providing one or more interfaces for communication between computer system 1300 and one or more input and/or output (I/O) devices. Computer system 1300 may be communicably connected to one or more of these I/O devices, which may be incorporated into, plugged into, paired with, or otherwise communicably connected to vehicle 120 (e.g., through the TCM ECU). An input device may include any suitable device for converting volitional user input into digital signals that can be processed by computer system 1300, such as, by way of example and not limitation, a steering wheel, a touch screen, a microphone, a joystick, a scroll wheel, a button, a toggle, a switch, a dial, or a pedal. An input device may include one or more sensors for capturing different types of information, such as, by way of example and not limitation, sensors 1210 described above. An output device may include devices designed to receive digital signals from computer system 1300 and convert them to an output format, such as, by way of example and not limitation, speakers, headphones, a display screen, a heads-up display, a lamp, a smart vehicle accessory, another suitable output device, or a combination thereof. This disclosure contemplates any suitable I/O devices and any suitable I/O interfaces 1308 for them. I/O interface 1308 may include one or more I/O interfaces 1308, where appropriate.

In particular embodiments, communication interface 1310 includes hardware, software, or both providing one or more interfaces for data communication between computer system 1300 and one or more other computer systems 1300 or one or more networks. Communication interface 1310 may include one or more interfaces to a controller area network (CAN) or to a local interconnect network (LIN). Communication interface 1310 may include one or more of a serial peripheral interface (SPI) or an isolated serial peripheral interface (isoSPI). In some embodiments, communication interface 1310 may include a network interface controller (NIC) or network adapter for communicating with an Ethernet or other wire-based network or a wireless NIC (WNIC) or wireless adapter for communicating with a wireless network, such as a WI-FI network or a cellular network.

In particular embodiments, bus 1312 includes hardware, software, or both coupling components of computer system 1300 to each other. Bus 1312 may include any suitable bus, as well as one or more buses 1312, where appropriate. Although this disclosure describes a particular bus, any suitable bus or interconnect is contemplated.

Herein, a computer-readable non-transitory storage medium or media may include one or more semiconductor-based or other integrated circuits (ICs) (such, as for example, field-programmable gate arrays or application-specific ICs), hard disk drives, hybrid hard drives, optical discs, optical disc drives, magneto-optical discs, magneto-optical drives, solid-state drives, RAM drives, any other suitable computer-readable non-transitory storage media, or any suitable combination. A computer-readable non-transitory storage medium may be volatile, non-volatile, or a combination of volatile and non-volatile, where appropriate.

FIG. 13B illustrates example firmware 1350 for a vehicle ECU 1300 as described with respect to control system 1230. Firmware 1350 may include functions 1352 for analyzing sensor data based on signals received from sensors 1210 or cameras 1220 received through communication interface 1310. Firmware 1350 may include functions 1354 for processing user input (e.g., directly provided by a driver of or passenger in vehicle 120, or provided through a computing device 1250) received through I/O interface 1308. Firmware 1350 may include functions 1356 for logging detected events (which may be stored in storage 1306 or uploaded to the cloud), as well as functions for reporting detected events (e.g., to a driver or passenger of the vehicle through an instrument display or interactive interface of the vehicle, or to a vehicle manufacturer, service provider, or third party through communication interface 1310). Firmware 1350 may include functions 1358 for assessing safety parameters (e.g., monitoring the temperature of a vehicle battery or the distance between vehicle 120 and nearby vehicles). Firmware 1350 may include functions 1360 for transmitting control signals to components of vehicle 120, including other vehicle ECUs 1300.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The invention claimed is:

1. A control system for a vehicle, the control system comprising one or more processors and a memory coupled to the processors comprising instructions executable by the processors, the processors being operable when executing the instructions to:
    detect, by a sensor of the vehicle, information regarding an object within a specified area, wherein the specified area is divided into tiles;
    classify, based on the information regarding the object, a set of the tiles as unobstructed tiles;
    identify, based on the set of unobstructed tiles and a footprint of the vehicle, a parking area for the vehicle within the specified area, wherein the footprint of the vehicle fits inside the parking area, wherein the footprint of the vehicle comprises a configuration of a plurality of tiles included in the tiles, and the parking area comprises a configuration of a plurality of unobstructed tiles included in the set of unobstructed tiles;
    generate a visualization associated with the parking area; and
    cause the generated visualization to be displayed on a user interface.

2. The system of claim 1, wherein the one or more processors being further operable when executing instructions to:
    detect, by the sensor of the vehicle, a ground slope angle within the specified area;
    classify, based on the ground slope angle being less than a slope threshold, a tile of the tiles as an unobstructed tile.

3. The system of claim 1, wherein the footprint of the vehicle comprises:
    a vehicle area;
    a vehicle length comprising the vehicle length or the vehicle length and an accessory length; and
    a vehicle width comprising the vehicle width or the vehicle width and an accessory width.

4. The system of claim 1, wherein the configuration of the plurality of unobstructed tiles comprises a contiguous set of the plurality of unobstructed tiles.

5. The system of claim 4, wherein the one or more processors being operable when executing instructions to identify the parking area are further based on a user preference.

6. The system of claim 5, wherein the user preference comprises:
    usage of an accessory of the vehicle;
    access to a storage compartment of the vehicle; or
    maximization of a shaded area, wherein the shaded area comprises:
        shade associated with the vehicle or the accessory; or
        shade associated with an environment.

7. The system of claim 6, wherein the one or more processors being operable when executing instructions to identify the parking area comprises the one or more processors being further operable when executing instructions to:
    modify, based on the usage of the accessory and a footprint associated with the accessory, the footprint of the vehicle.

8. The system of claim 6, wherein the one or more processors being operable when executing instructions to identify the parking area comprises the one or more processors being further operable when executing instructions to:
    modify, based on the access to the storage compartment and a footprint associated with a space for accessing the storage compartment, the footprint of the vehicle.

9. The system of claim 6, wherein the one or more processors being operable when executing instructions to identify the parking area is further based on a parking direction, wherein the parking direction is based on the maximization of the shaded area.

10. The system of claim 9, wherein the maximization of the shaded area is based on shade parameters, wherein the shade parameters comprises:
    dimensions of the vehicle, the dimensions comprising a vehicle height, a vehicle width, or a vehicle length;
    dimensions of the accessory, the dimensions comprising an accessory height, an accessory width, or an accessory length;
    a location associated with the vehicle, the location comprising a longitude and a latitude;
    an orientation associated with the vehicle, the orientation comprising a vehicle direction, a vehicle pitch, or a vehicle roll; or
    a position of a sun, the position comprising an azimuth angle of the sun or an elevation of the sun.

11. The system of claim 10, wherein the shade parameters further comprise:
    an ambient light reading;
    weather information associated with the location; or dimensions of the object comprising an object height, an object width, an object length, or an object clearance height.

12. The system of claim 1, wherein the one or more processors being operable when executing instructions to classify one or more of the tiles as the unobstructed tiles comprises the one or more processors being further operable when executing instructions to:
for a tile of the tiles:
determine, based on a position of the object and a dimension of the object being greater than a dimension threshold, that no object of interest is within the tile; and
classify, based on no object of interest being within the tile, the tile as an unobstructed tile.

13. The system of claim 12 wherein the dimension of the object comprises an object height, an object width, an object length, or an object clearance height, and wherein the dimension threshold comprises an object height threshold, an object width threshold, an object length threshold, or an object clearance height threshold.

14. The system of claim 1, wherein the visualization comprises a map view, a surround view, a top-down view, or a proximity view.

15. The system of claim 14, wherein the map view comprises:
a non-directional indictor displayed in a tile of the tiles; or
a directional indictor displayed in a tile of the tiles to show a parking direction.

16. The system of claim 15, wherein the one or more processors being further operable when executing instructions to:
predict a position and an area of a shaded area for a specified time interval; and
generate, based on the position and the area of the shaded area, a visualization of the shaded area for the specified time interval comprising:
a visualization of the position and the area of the shaded area;
a timeline of the visualization; and
a scrubber for navigation of the visualization.

17. The system of claim 15, wherein the proximity view comprises a proximity indicator based on a distance from the object to the vehicle or to an accessory.

18. A method of providing parking recommendations for a vehicle, comprising:
detecting, by a sensor of the vehicle, information regarding an object within a specified area, wherein the specified area is divided into tiles;
classifying, based on the information regarding the object, a set of the tiles as unobstructed tiles;
identifying, based on the set of unobstructed tiles and a footprint of the vehicle, a parking area for the vehicle within the specified area, wherein the footprint of the vehicle fits inside the parking area, wherein the footprint of the vehicle comprises a configuration of a plurality of tiles included in the tiles, and the parking area comprises a configuration of a plurality of unobstructed tiles included in the set of unobstructed tiles;
generating a visualization associated with the parking area; and
causing the generated visualization to be displayed on a user interface.

19. A non-transitory computer-readable medium comprising instructions that, when executed by one or more processors of one or more computing devices, cause the one or more processors to:
detect, by a sensor of a vehicle, information regarding an object within a specified area, wherein the specified area is divided into tiles;
classify, based on the information regarding the object, a set of the tiles as unobstructed tiles;
identify, based on the set of unobstructed tiles and a footprint of the vehicle, a parking area for the vehicle within the specified area, wherein the footprint of the vehicle fits inside the parking area, wherein the footprint of the vehicle comprises a configuration of a plurality of tiles included in the tiles, and the parking area comprises a configuration of a plurality of unobstructed tiles included in the set of unobstructed tiles;
generate a visualization associated with the parking area; and
cause the generated visualization to be displayed on a user interface.

* * * * *